US006820237B1

(12) United States Patent
Abu-Hakima et al.

(10) Patent No.: US 6,820,237 B1
(45) Date of Patent: Nov. 16, 2004

(54) APPARATUS AND METHOD FOR CONTEXT-BASED HIGHLIGHTING OF AN ELECTRONIC DOCUMENT

(75) Inventors: Suhayya Abu-Hakima, Kanata (CA); Connie P. McFarland, Gloucester (CA)

(73) Assignee: AmikaNow! Corporation, Kanata (CA)

( * ) Notice: Subject to any disclaimer, the term of this patent is extended or adjusted under 35 U.S.C. 154(b) by 0 days.

(21) Appl. No.: 09/494,312

(22) Filed: Jan. 21, 2000

(51) Int. Cl.[7] .............................................. G06F 17/24
(52) U.S. Cl. .................................................... 715/531
(58) Field of Search ................................ 715/531, 530; 707/101; 706/10

(56) References Cited

U.S. PATENT DOCUMENTS

| | | | |
|---|---|---|---|
| 5,526,443 A | 6/1996 | Nakayama | |
| 5,634,051 A | 5/1997 | Thomson | |
| 5,635,918 A | 6/1997 | Tett | |
| 5,652,789 A | 7/1997 | Miner et al. | |
| 5,742,905 A | 4/1998 | Pepe et al. | |
| 5,802,253 A | 9/1998 | Gross et al. | |
| 5,825,759 A | 10/1998 | Liu | |
| 5,890,152 A | 3/1999 | Rapaport et al. | |
| 5,924,108 A | * 7/1999 | Fein et al. ................... | 715/531 |
| 6,205,456 B1 | * 3/2001 | Nakao ......................... | 715/531 |
| 6,334,132 B1 | * 12/2001 | Weeks ......................... | 707/101 |
| 6,349,316 B2 | * 2/2002 | Fein et al. ................... | 715/531 |
| 6,499,021 B1 | * 12/2002 | Abu-Hakima ................ | 706/10 |

FOREIGN PATENT DOCUMENTS

| | | |
|---|---|---|
| CA | 2236623 | 12/1998 |
| EP | 0 933 712 A | 8/1999 |

OTHER PUBLICATIONS

Kevin Marron: Digital clerk will channel e–mail tide; Technology at Work, Online!; Aug. 27, 1999; pp 1–3.

Anan: "Kanata's AmikaNow! launches email clerk"; Netstuff, 'Online!'; Jul. 19, 1999, pp 1–21.

"Selecting Text Spans For Document Summaries: Heuristics and Metrics", American Association of Artificial Intelligence 1999 Conference Proceedings.

* cited by examiner

*Primary Examiner*—Stephen S. Hong
*Assistant Examiner*—Doug Hutton
(74) *Attorney, Agent, or Firm*—Cassan Maclean

(57) ABSTRACT

An computer-readable apparatus and method for intelligently analyzing and highlighting key words/phrases, key sentences and/or key components of an electronic document by recognizing and utilizing the context of both the electronic document (which may be any type of electronic message such as e-mail, converted voice, fax or pager message or other type of electronic document) and the user. The apparatus and method produce an electronic output highlight document from a user's electronic input document. An application context module determine with respect to the input document the type of document it is. A user context module determines the context of the user with respect to the input document. A highlighter module determines at least a portion of the key content of the input document, up to a predetermined maximum data size, at least in part on the basis of the determinations made by the application and user context modules. Output highlight document producing means produces the output document from the key content.

9 Claims, 1 Drawing Sheet

APPARATUS AND METHOD FOR CONTEXT-BASED HIGHLIGHTING OF AN ELECTRONIC DOCUMENT

FIELD OF THE INVENTION

The invention pertains to the field of text reduction by selecting the key content thereof and, more particularly, to an apparatus and method for intelligently analyzing and highlighting key words/phrases, key sentences and/or key components of an electronic document by recognizing and utilizing the context of both the electronic document (which may be any type of electronic message such as e-mail, converted voice, fax or pager message or other type of electronic document) and the user.

BACKGROUND OF THE INVENTION

The volume of information in the form of text, particularly electronic information, being communicated to users is increasing at a very high rate and such information can take many forms such as simple voice or electronic messages to full document attachments such as technical papers, letters, etc. Because of this, there is a growing need in the communications, data base management and related industries for means to intelligently condense electronic text information for purposes of assisting the user in handling such communications and for effective storage and retrieval of the information.

The known document condensers (sometimes also referred to as key word/phrase "extractors" or as "summarizers"), which typically function to identify a set of key words/phrases by utilizing various statistical algorithms and/or pre-set rules, have had limited success and limited scope for application. One such known method of condensing text is described in Canadian Patent Application No. 2,236,623 by Turney which was laid open on 23 Dec. 1998; the Turney method disclosed by this reference relies upon the use of a preliminary teaching procedure in which a number of pre-set teaching modules, directed to different document categories or academic fields, are provided and a selected one is run prior to using the text condenser in order to revise and tune a set of rules used by the condenser so as to produce the best results for documents of a selected category or within the selected academic field. However, such prior condensers do not advance the art appreciably because they are primarily statistically based and do not meaningfully address semantic factors. As such they are directed to producing lengthy indices of key words and phrases per se with the result that the relationships or concepts between those key words and phrases is often lost. They also ignore the intent of the electronic document and, hence, treat news, papers, discussions, journal papers, etc. generically.

The inventors herein have identified that the difficulty faced by any means of generating a summary of the key content of a given body of text of an electronic document, which must be overcome, is in recognizing and accommodating the specific context of the text. This is because electronic documents of various types are typically not authored in a structured or consistent manner. In addition, in some cases the context of the user may be an important factor to be accommodated because the interpretation of the meaning of a given body of text by one reader is personal to that reader and may not be the same interpretation made by another reader.

For example, by recognizing that a given electronic document is a discussion email, as distinguished from a technical paper or a news item, a particular structure can be assigned to that text for purposes of analysis. This is because email messages are typically informal (colloquial), less structured, shorter, have less redundancy and are often continuations of earlier email messages. By contrast, technical papers typically comprise a formal language format and are themselves structured according to a standard format (such as having a title and section headings, an opening summary, a background section, etc.). Similarly, news items have associated with them a pyramid-type format, usually providing the key content within the first paragraph or two (see Mittal V. et al "Selecting Text Spans for Document Summaries: Heuristics and Metrics", American Association of Artificial Intelligence 1999 Conference Proceedings).

It has been found that the specific type of the electronic document which is to be processed, referred to herein as the "application context", can be determined from the document text and format and the environment of the text which is referred to herein as the envelope of the electronic document. For example, it can be determined whether the text has an ASCII or HTML format and whether it arrived as an email or an attachment or otherwise. Text which is correspondence will typically have an opening salutation such as "Dear John", a main body of text and a signature block with one of the words "regards", "truly", "sincerely", etc. For email discussions of an on-going nature they may have been forwarded or may be a part of a reply message and some of the content thereof may be indented by the de facto standard character ">". Once the application context of the electronic document has been determined the highlighting process can be assisted by differentiating between the envelope and the text components of the document; for example, on the basis of this information any superfluous information such as the salutation and signature block may be identified and removed. The particular application context may also dictate the handling of certain information which is typically relevant to that context.

Additional context information relating to an electronic document, referred to herein as the "user context", which can be useful to infer the meaning of the text of that document may be obtained from knowledge of the user. That is, knowledge of the specific user context might, in some cases, assist in a determination as to which components of a given body of text are relevant. One example of this which would apply to the optimal automation of a personal text highlighter used, say, for processing one's received electronic messages, is that an electronic document which has been recognized to be a product/service advertisement of the type (i.e. determined from the envelope, for example) which the user normally deletes, could simply be truncated without any analysis applied to it; this would occur where it has been learned from the user context that the particular user is not interested in the content of such a document. On the other hand, advertisements which are targeted to the user through pre-selected identifiers could instead be highlighted for the user. Further examples in which the user context may be effectively utilized include the situation where correspondence received from one sender may be more important to the user than correspondence from another sender, where the time of receipt of certain correspondence may determine a particular importance level to the user and where specific words may be used more frequently by the user and these might be associated with a particular degree of relevance. Thus, the behaviour pattern and the situation of the user provides additional context parameters on which a process for highlighting the key components of the text of an electronic document may be based.

Reference herein to "highlighting" means an electronic process of selecting the key components of a given body of electronic text (e.g. in the form of key words/phrases, key sentences or parts thereof and/or key elements thereof, not simply a string of disjointed keywords), the result appearing analogous to that which would be obtained by the commonly used manual method of highlighting a printed copy of the text using a fluorescent ink marker.

SUMMARY OF THE INVENTION

In accordance with the invention there is provided computer-readable apparatus for highlighting the content of a user's electronic input document and producing therefrom an electronic output highlight document. An application context module is provided for determining with respect to the input document the type of document it is. A user context module determines the context of the user with respect to the input document. A highlighter module determines at least a portion of the key content of the input document, up to a predetermined maximum data size, at least in part on the basis of the determinations made by the application and user context modules. Means are provided for producing the output highlight document from the key content.

Preferably a document mapping module is provided for producing a static document map of the content of the input document, wherein the highlighter module applies to the static document map weights and/or conditions derived from the determinations made by the application and user context modules to determine key content therefrom. The key content may comprise key words/phrases, key sentences and/or key components of the input document. The determination of key content by the highlighter module may result from mathematically calculating scores in respect of the content of the document map. A portion of the key content may be determined by one or both of the application and context modules and the application, context and highlighting modules determine the key content on a graduated basis whereby content is excluded only if necessary in order to satisfy the limitation of the predetermined maximum data size.

Also in accordance with the invention there is provided a method comprising the steps of determining with respect to the input document the type of document it is; determining the context of the user with respect to the input document; determining at least a portion of the key content of the input document, up to a predetermined maximum data size, at least in part on the basis of the determinations of the type of document it is and the context of the user; and, producing the output highlight document from the key content.

DESCRIPTION OF THE DRAWINGS

The present invention is described in detail below with reference to the following.

DETAILED DESCRIPTION OF A PREFERRED EMBODIMENT

Figure 1:
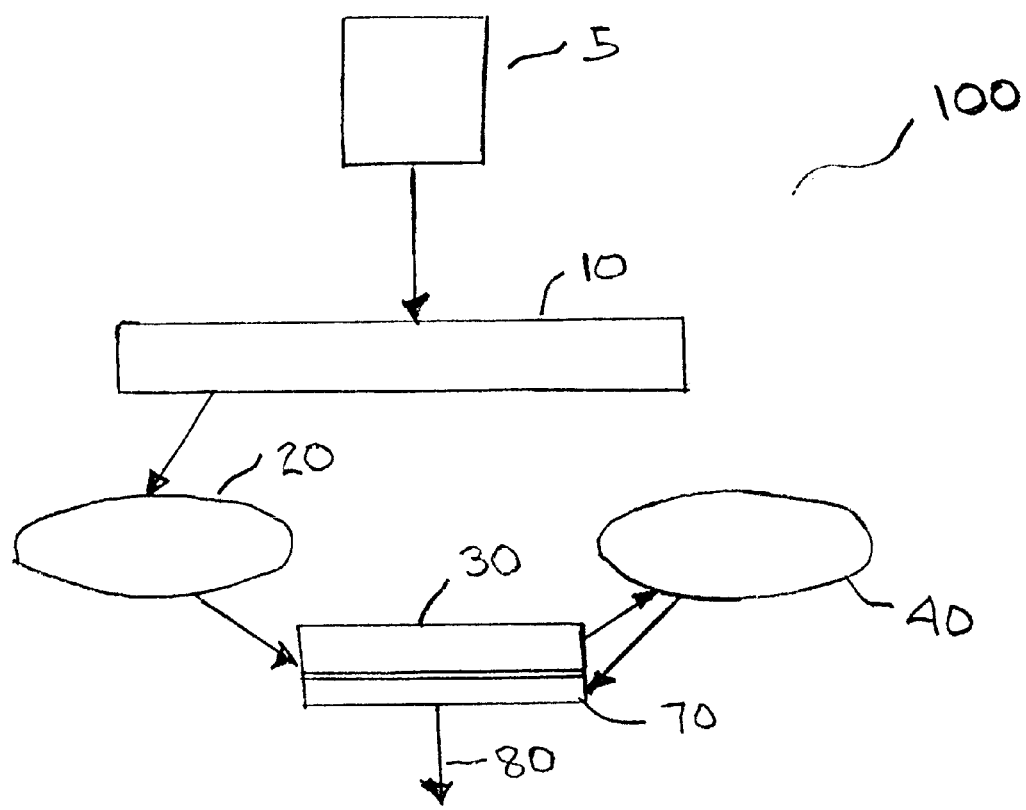
FIG. 1 is a system flowchart diagram showing the components, and sequence of processing, of a text highlighting system in accordance with the present invention.

FIG. 1 generally identifies the process steps and components of a preferred text highlighting method and apparatus 100 in accordance with the invention claimed herein. As shown by FIG. 1, the input electronic document 5 is processed by an application context module 10 and a user context module 20 to identify and apply knowledge associated with the particular application and user contexts of that document. If appropriate the document is processed according to its specific application (i.e. as determined by the application context module 10) using a selected specialized application module 30 and, if appropriate, the document is then processed by a generic highlighting module 70.

The highlighting processing is performed by the method and apparatus on a graduated, "cull only as needed"-basis, the objective being to remove from the document only that amount of text (if any) which is needed to appropriately reduce the size of the document such that the size of output highlight document 80 is not larger than a predetermined (i.e. allocated) maximum data size. For example, depending upon the use to be made of the output document 80, the text may be required to be no larger than a predetermined character length L. For example if the output highlight document 80 is to be used for a message highlighter field within an email application a character length L of 40 may apply as the maximum data size. On the other hand, if the highlight document is to be displayed by a personal digital assistant such as, for example, a PalmPilot™ the maximum data size L may be 200 characters. For an alpha-numeric pager the allowable data size may be 150 characters.

As indicated above the reference herein to "graduated" highlighting processing means that the word content of the document is reduced only on a "need to do so"-basis in order to meet the size constraint L which applies to the output highlight document 80. Thus, if the output document will meet this constraint by simply removing some of the white space and filler content then only this is done and the text is otherwise not changed. Accordingly, the highlighting processing is performed in stages whereby the formatting (including the "white space" being spaces such as character and line spacing etc.) and filler/generic exclude words are removed in the initial stages so as to eliminate any further culling of the content in cases where those initial steps have been successful to reduce the length of the document to size L as predetermined by the target application (which may be a desk top display, cellular phone, alpha-numeric pager display or voice clip if the application requires conversion of the text highlight document to voice).

The application and user contexts of the document are determined by means of modules 10 and 20 (which, together, are referred to by the applicant as Context Mining™ processes). Modules 10 and 20 may also assign context-specific weights (for scoring purposes) and/or conditions to the text content of the document. A generic document map for each input document 5 is separately determined by a document mapping module 40. The document map comprises static information to which a given set of dynamically determined context-specific weights and/or conditions may be assigned. Table A below illustrates a simple example of a document map for text consisting of five sentences (numbered as sentences 0–4 in the document map), with the resulting highlights generated by the apparatus 100 shown in the displayed input text, and Table B shows word stem maps for the document map of Table A and legends pertaining to each of these tables.

The term "module" herein refers generally to any set of computer-readable instructions or commands and is not limited to any specific location or means of implementation of the same (software being the preferred and most usual form contemplated).

In FIG. 1 the first illustrated component of the system is the application context module 10 which determines the context of the specific input electronic document 5 (the input document being a body of text in electronic form, possibly having been converted to text from a voice clip or bit map image), that is, whether it is a basic email, formal correspondence, a web page, a news item, an announcement, a structured document or some other type of text document. This module assesses various factors and criteria to make this decision. For example, the type of document may be identified from the path through which it arrived, such as from an email directory, an OCR reader, a voice converter, etc., and the layer of addressing etc. information which surrounds it. The source of the text, being either an email, attachment to an email, web page, news reader or other source is determined because this may explicitly identify the type of document which is to be summarized (as would be true, for example, of a document received from a news reader since only news items would be received from that source). If the source identification component identifies a source from which the type of document is not explicit, such as an email, then the document itself is reviewed for pre-set identifiers which may assist to determine the context of the text. For an email discussion document the primary context identifiers are the structural email components defined as the greeting, the body and the sign-off of the document. For an email attachment document the context may be determined by means of system-based identifiers such as the various filename extensions which the user's computer system has assigned to different document types (e.g. ".doc" or ".wpd" to identified word processing documents, ".zip" to identify compressed files, ".exe" to identify an application file, etc.). Furthermore, there may be structural document indicators embedded in the document itself, such as a title and headings, a table of contents, an introduction, chapters, etc., which the application context module 10 identifies and assesses to determine the application context of the input document.

The next component of the system shown in FIG. 1, and step in the process of text highlighting, is the user context module 20. This component determines the context of the user in relation to the input document 5. For example, the sender, recipient and time information associated with an e-message document may be reviewed and assessed by module 20. It may then attempt to match the sender information to a designated user context condition or weighting using a sender-based context directory. The recipient information may be assessed by user context module 20 to identify whether the user is the main and/or only recipient or, instead, one of many recipients (e.g. by copy). A designated priority is assigned to the user context on the basis of the combination of elements of information provided by the document. Each information element associated with the document represents a clue of its context and is assessed and used by module 20 for the purpose of determining, on a dynamic basis, the conditions and weights to be assigned to the text content thereof. For example, a different approach to text highlighting may be required for any given message sent by one sender to the user depending upon the time or day it is sent (i.e. whether a work day or week-end) and a still different approach may be applied in respect of a message sent by the same sender but to many different recipients.

The user contexts determined the user context module 20 are associated with specific conditions and/or assigned weights on which the highlighting apparatus 100 is to act when highlighting the text content of an input document 5. The conditions assigned by module 20 may, for example, be to require the inclusion or exclusion of certain words/ phrases in the resulting output document 80 or to initiate a specific handling of the document such as no highlighting, partial or complete truncation of the document, etc. These conditions are input by the user and/or are determined from system or background information. For example, the system of a user's desktop running the highlighting apparatus may detect idle activity and conclude that the user has left the office for the day in which case mobile user weights and/or conditions may be generated for the document in that specific context. As a further example, in circumstances where the apparatus detects that the sender of the document is a new contact of the user (i.e. where the sender is not identified in the user's desktop contacts data file) it may be directed (i.e. through appropriate programming) to carry out a background search of the sender, for example by searching the Internet under the domain name under which the sender sent the document, so as to permit the apparatus to appropriately designate a user context for the document.

Once the application and user contexts have been designated by modules 10 and 20 one of a plurality of available specialized application modules 30 is selected and the algorithm thereof is applied to the text of the input document 5, the choice of the specific specialized module being determined by application context of the document. A tagged document results from the application of the selected specialized module and is input to the generic highlighter module 70. If the input document 5 is a general news item it is assumed to have a pyramid structure whereby the main content is in the first few paragraphs and the start of each remaining paragraph, at least, is assumed to be overlapping content. On this basis the general news module operates to identify a topic heading (if any) and assigns weights to text of the document, for purposes of determining the final scoring of the text content, which correlate to the characteristics of a general news document. As such, a general news input document 5 is tagged by this module of the specialized application modules 30 with weights that are appropriate for scoring the various parts of its text content.

If the input document 5 is a company news item it is processed by a company news module of the specialized application modules 30 which performs the same steps as the general news module but which also identifies and tags the company name to which the news item pertains. Similarly, if the document is a company product news item the same steps are applied but both the company name and product name are identified and tagged to the document. The tagging of the company name and/or product name may be such as to direct the apparatus to include these names as the first items of the output highlight document 80.

If the input document 5 is a structured document such as a technical report or academic article it is processed using one of two alternative algorithms of a structured text module of the specialized application modules 30 depending upon the user context conditions and whether one algorithm has been designated as a default algorithm. The first and simplest of the structured text algorithms identifies and tags the title (if any) and removes all formatting and control characters from the document so that only text remains (with any graphics also being removed including any text embedded therein) and then passes the resulting altered text document to the generic highlighting module 70. The second specialized structured text algorithm makes use of the meta information of the document (i.e. the document headings, abstract, table of contents and executive summary) which is assigned weights for use in determining the final scoring of the content of the document. If the applicable maximum output data size L is not exceeded once this meta information is processed and, subject to any context designated or user-set conditions, the content of the document is passed to the generic highlighter module 70. If, however, the maximum output size has been reached then only the meta information is output as the highlight document 80 (that is, the generic highlighter module 70 is by-passed in such circumstances).

If the document is an electronic message (i.e. a basic email, an OCR-converted fax or an electronic converted voice message) an e-message highlighter application module 30 is used to process the text in conjunction with the generic highlighter module 70. The e-message highlighter module 30 first analyses the message to identify clues as to what type of message it is, for example, whether it is an electronic news item, an announcement, a call for participation in some event, an advertisement, an email discussion between individuals, fax correspondence or a voice message. It does so by assessing the output of the application context module 10 and by analysing the envelope of the message, namely, the components of the message which surround and/or accompany the message but which are not the body of the message. In the case of an email document the envelope of information associated with it includes an identifiable format from which the source of the document, who it is for and who else is involved may be determined. A fax message has associated with it a different structure and envelope characteristics and is readily distinguishable from, say, an email discussion document.

If the electronic message is identified to be a news item it is processed by the aforesaid news application module. If the message is an announcement, call for participation or advertisement it is processed by the generic highlighter module 70. If it is an email sent between people on a particular topic of discussion, however, the applicant has identified that there is a need to address both the colloquial nature and the special characteristics of such email communications. This need is addressed by the e-message highlighter module of the specialized application modules 30.

Where the input document 5 has been determined to be an email discussion the e-message highlighter module identifies the different regions of the email, namely, the main header, the greeting, the main body of text, any embedded email (i.e. in the case of a reply or forwarded email, being referred to herein as "threaded" emails because each consists of a number of distinct emails which are coupled together, one followed by another) and the sign-off and/or signature. The user may select to have specific parts of the document highlighted in every case (or, for example, deleted in every case, as determined by the user preferences). For example, the first line of the main body of text may be designated to be always included in the document highlights in which case this text is tagged and weighted by the e-message highlighter module for inclusion in the output highlight document 80. The e-message highlighter module identifies in the document, and applies a weighting to, any "include" and "exclude" keywords based on pre-set rules (which may be generic or, instead, may be directed to a specific art or discipline such as in the context of medical or legal documents). Also, for an email discussion document, action words (verbs) are preferably assigned a higher weight than nouns. Normally, for a discussion email which is not a reply or forwarded email the content of the subject line is tagged for inclusion in the output highlight document 80.

The regions of the email which are to be highlighted are then identified. For threaded emails they are processed according to user designated preferences, the constraint L representing the maximum output size of the highlight document 80, and whether it is a forward or reply email.

If the total amount of text of the regions of the email which are designated to be highlighted is of a lesser size than L the generic highlighter module 70 is by-passed and the output document 80 is created from that designated text. Otherwise, the designated regions are processed by the generic highlighter module 70 to score the content thereof according to the weights assigned thereto and produce a sentence-level set of highlight text which is limited to the size constraint L.

The output highlight document 80 is produced by compiling those parts of the document which have been tagged for inclusion (such as the sender information) and the highlight text output from the generic highlighter module 70.

If the document is a Web page (of HTML format) a Web page application module of the specialized application modules 30 processes the document by parsing the HTML (and any meta tag information generally) and then the text of the resulting document is highlighted using the generic highlighter module 70.

On the other hand, if the application context of the document cannot be determined no specialized application module 30 is used and the document, as a whole, is processed by the generic highlighter module 70.

The generic highlighter module 70 uses both static and dynamic information pertaining to the input document 5 to produce a sentence level set of highlight text. The static information, in the form of a document map, is produced by a document mapping module 40 using as input the text which is output from whichever specialized application module 30 processed the input document 5 (or the text of the input document 5 itself if it was not processed by a specialized application module). For example, an input document representing a Web page would have had the HTML screening applied to it by the Web page application module, as described above, so the HTML stripped document would be input to the document mapping module 40 to produce a document map. Dynamic information, in the form of a set of keywords and/or phrases which are to be either excluded from or included in the output document and/or weight assignments and/or conditions that have been (dynamically) established by the application and user context modules 10 and 20, is input to and used by the generic highlighter module 70 to process and highlight the content of the document map.

The document mapping module 40 creates a static document map from the output text of whichever specialized application module 30 has processed the input document 5 (or the input document if no specialized application module has processed the document). A very simplified document map is shown below under Table A for purposes of illustrating the static content thereof. As shown, the document map preserves the key knowledge (i.e. word and sentence relationships) of the content of the document and applies various identifiers to the words and stems thereof which function to locate the words, phrases and sentences within a specified paragraph and to identify their frequency. For the document map of Table A the filler/exclude words have been deleted but, if desired, these could instead be included through the use of codes in order to preserve the full knowledge of the document while minimizing the amount of space required to do so. The various words, phrases and sentences of the document map are assigned a weight as determined by the context modules 10 and 20, and possibly also whichever specialized application module 30 processed the input document. The assigned weights and other pre-set criteria (e.g. statistical criteria such as factoring into the scoring calculation the frequency of occurrence of a word)

are applied to an efficient mathematical algorithm to calculate a score for each word stem and also a score for each sentence. The word stems and sentences having the highest score are used to produce a set of output text highlights.

The document map is created by removing from the input document (after it has been processed by the applicable specialized application module 30) all white space (i.e. formatting such as line spacing), all first stage words, referred to as "exclude" words, which may be defined as conjunctive words (i.e. such as the words "and", "with", "but", "to", "however", etc.), articles (i.e. such as the words "the", "a", "an", etc.), forms and tenses of the words "to have" and "to be" and other filler words such as "thanks", "THX" "bye" etc. If the resulting text, together with any header, sender or other information which has been tagged for inclusion in the output document 80, is less than or equal to the maximum output document length L no further highlighting processing is performed and the output highlight document 80 is produced from this resulting text. If otherwise, the text, is then stemmed by removing suffixes from applicable words to produce the root thereof (lower case letters only and without punctuation). For example, the words "computational" and "computer" would both be stemmed to the same root viz. "comput". The document map includes stem maps and a frequency count designation is assigned to each stem as illustrated in Tables A and B. It is important that the resulting document map preserve the sentence and paragraph structure of the document. The document map comprises a complete list of all word/phrase stems with a frequency count per stem and sentence demarcation. Each phrase is defined as having a preselected number of consecutive words containing no punctuation or exclude words.

The document map provides a static (fixed) information record for the input document 5 which may be stored and processed at a later time by the generic highlighter module 70 using a different set of weights and conditions which may be based on new system or user-specified weights/conditions generated at such time. This is advantageous for purposes of testing the effectiveness of a particular scoring algorithm, for efficiency and, most critically, as an important tool used in achieving the dynamic characteristic of the present highlighter method.

The negation key phrases of the document map are identified using a negation words list and by determining whether the word "not" is in any form (e.g. as "n't" in the words "couldn't", "shouldn't", "wouldn't", "won't", etc.) present in a phrase. These negation key phrases are flagged and given a weight for purposes of scoring them.

The action key phrases of the document map are identified using a verbs list and they are scored on the basis of assigned context weights and conditions. For example, in the case of an email discussion document a verb will be given a higher weight than a noun but the opposite is true of a structured document such as a technical report. Numeric values associated with dates, time and amounts of money, and numeric ranges, are also flagged and weighted for purposes of scoring.

The remaining words/phrases of the document are scored in the manner described in the aforementioned Canadian patent application No. 2,236,623 to Turney (see also the references Lovins, B. J., "Development of a Stemming Algorithm", Mechanical Translation and Computational Linguistics, 11, 22–31 (1968) and Luhn, H. P., "The Automatic Creation of Literature Abstracts", IBM Journal of Research and Development, 2, 159–165 (1958) regarding various factors which may be considered by the stemming algorithm depending upon the application and the attributes desired therefore), but differing therefrom in the following respects, to make use of the "include/exclude" words/ phrases developed by the context modules 10 and 20. All of the include/exclude words/phrases are stemmed and both the stemmed and unstemmed word/phrases are matched to the text to be scored so as to provide for more intelligent and effective matching. A match with a stemmed word is given a score which is less than that assigned to a match with the unstemmed word, to reflect the lesser degree to which the document text is the same as the derived include/exclude words, but which is still relatively high to account for the fact that the stemmed include/exclude word match is most likely to be as relevant or more relevant than other words which are to be scored. For example, if the word "psychology" has been tagged as an include word it would be searched in the document as both "psycholog" and "psychology" and if the word "psychological" were to be located in the document it would be given a relatively high score but not as high a score as would be assigned to the exact word "psychology" if found in the document. Also unlike the scoring process of the Turney application, which invariably applies a higher score to nouns over that allocated to verbs, the applicant's claimed process recognizes that the likely relevance of action words is dependent upon the application context and, therefore, it may assign a higher weighting to verbs than nouns depending upon the context. For example, verbs in email discussion documents are given a higher weight than verbs located in reference documents such as technical papers because the content of the latter is theme based whereas email content tends to be succinct and may be essentially directive in which case verbs may be pertinent. If the application context modules 10 and 20 have not identified that verbs are to be given a higher weighting than nouns the default assignment is to assign a higher weight to nouns than verbs.

In addition to the scoring of words and phrases the generic highlight module 70 also scores sentences whereby sentences in a document having a higher number of highly ranked words/phrases are themselves, as a whole, given a relatively high ranking. A clustering factor may also be applied to rank the words, phrases and sentences whereby it is recognized that high ranking sentences which are closer together are likely to be more pertinent than more distant sentences having the same high ranking. The resulting sentence-level highlighted text is more likely than the prior text condensers to include structured (readable) text, having more content in the form of sentences, rather than simply a disjointed collection of words/phrases.

The final steps applied by the generic highlighter module 70 are the expansion of the stem words and phrases having the highest scores, the restoration of those top ranked words and phrases within their sentences in cases where the sentences have themselves been highly scored and the restoration of punctuation and capitalization to produce a sentence-level set of highlight text based on the content of the input document 5. The key content of the input document 5, comprising the key words, key phrases and/or key sentences of the highlight text produced by the generic highlighter module 70 and any key components of the input document 5 which have been tagged for inclusion in the output highlight document 80 (such as components of the header in the case of an email) are combined to produce the output highlight document 80. Unlike the known text condenser methods, which do not utilize a document map, the applicant's present method of expanding the stem word/ phrases is very efficient in that it is achieved by simply referring to the document map.

With reference to the document map and highlighter text results illustrated by Tables A, this example shows that, for the particular application and user contexts which applied to that example none of sentence nos. 2 and 3 was highlighted. This means that lower scores were calculated for the word stems located in sentence nos. 2 and 3 than for those stems located in the sentence nos. 0, 1 and 4, the reason being, in this case, that the application context module 10 was configured to assign relatively high weights to the first two and last sentences of the sample input document. However, such criteria for assigning weights to the text content of the document is just one of many such criteria that may be adopted and, as is known in the art, there are many other criteria and factors which are pertinent to the resulting calculated scores. One such factor is whether the calculation applies an additive or multiplicative relationship to the assigned weights. The choice of the criteria and scoring factors to be adopted will depend upon the particular application and the invention claimed herein is not limited to or dependent upon any particular such choice.

It is to be understood that the specific elements of the text highlighting apparatus and steps of the method described herein are not intended to limit the invention defined by the appended claims. From the teachings provided herein the invention could be implemented and embodied in any number of alternative computer program embodiments by persons skilled in the art without departing from the claimed invention.

TABLE B-continued

| | |
|---|---|
| Send = 1 [2,1,1] | disc cont = 1 [0,3,2] |
| Y2K = 1 [4,3,1] | Euro say = 1 [4,1,2] |
| Meet = 1 [0,1,1] | Key pers = 1 [2,2,2] |
| Sche = 1 [0,0,1] | |
| Plan = 1 [2,0,1] | |
| Rect = 1 [4,7,1] | |
| Make = 1 [3,0,1] | |
| of size 3: Not been addr = 1 [4,4,3] of size 4: (none) | | wherein, <word> indicates that <word> occurs in text (pixel) position i-j
  i j   of the document and is identified as a
  type "type" word.
  <stem> = f [s,p,l] indicates that the word stem occurs
    with frequency f in the position (s = sentence,
    p = index in sentence, l = number of words)

Generated Output Text Highlights:

schedule meeting today discuss contracts?
logistics involved servicing contracts Europe.
contacts Europe say Y2K not been addressed rectify promptly.

What is claimed is:

1. Computer-readable apparatus comprising modules executable by said computer's programmable processor for highlighting content of a user's electronic input document and producing therefrom an electronic output highlight document, said apparatus comprising:

(a) an application context module configured for determining with respect to said input document the context of said document, based upon: (i) an identification of the path through which said document arrived as determined by a source identification component of said application context module; and, (ii) context identifiers of said document used by said application context module for determining what type of document it is;

(b) a user context module configured for determining a context of said user with respect to said input document, whereby said user context includes a relationship of the user to said document and/or its source; and, (c) a highlighter module configured for: i) deter-

TABLE A

Input Text Document (with greeting and sign-off removed) showing output highlights:

Can we schedule a meeting today to discuss contracts?
There are many logistics involved with servicing contracts in Europe.
We should plan to send the key personnel for Friday, December 10th.
I can make the travel arrangements.
By the way, our contracts in Europe say that the Y2K issues have not been addressed and we must rectify promptly.
Document Map (for Above Input Text Document):

SENTENCE NO.

| | | | | | | | | |
|---|---|---|---|---|---|---|---|---|
| 0 | schedule | meeting | today | discuss | contracts | ? | | |
| | 9 16 | 20 26 | 28 32 | 37 43 | 45 53 | 54 54 | | |
| | word | word | dateword L1 | word | word | sentence ending | | |
| 1 | logistics | involved | servicing | contracts | Europe | . | | |
| | 71 79 | 83 90 | 97 105 | 107 115 | 120 126 | 126 126 | | |
| | word | word | word | word | word | sentence ending | | |
| 2 | plan | send | key | personnel | Fri | Dec | 10 | th | . |
| | 138 141 | 146 149 | 155 157 | 159 169 | 175 174 | 183 185 | 192 193 | 194 195 | 196 196 |
| | word | word | word | word | dateword L1L2 | datewordL1L2 | number digit | timeword | sentence ending |
| 3 | make | travel | arrangements | . | | | | |
| | 204 207 | 213 218 | 220 231 | 232 232 | | | | |
| | word | word | word | sentence ending | | | | |
| 4 | contracts | Europe | say | Y2K | not | been | addressed | rectify | . |
| | 253 260 | 265 270 | 272 274 | 285 287 | 301 303 | 305 308 | 310 318 | 334 340 | 355 355 |
| | word | word | word | alphanumeric word | negative word | stop word | word | word | sentence ending |

TABLE B

Stem Listing (showing stems which are highlighted in result)

| | | | |
|---|---|---|---|
| of size 1: | Cont = 1 [4,0,1] | of size 2: | Trav arra = 1 [3,1,2] |
| | Euro = 1 [1,4,1] | | Logi invo = 1 [1,0,2] |
| | Prom = 1 [4,8,1] | | Serv cont = 1 [1,2,2] | mining the key content, comprising key words/phrases, key sentences and/or key components, of said input document, up to a predetermined maximum data size, at least in part on the basis of the determinations made by said application context module and said user context module, wherein said highlighter module applies weights and/or conditions to said content of said input document, wherein said and/or conditions derived from said determinations made by said application context module and said user context module; (ii) producing said highlight document from said key content; and (iii) outputting said highlight document.

2. Apparatus according to claim 1 and further comprising a document mapping module configured for producing a static document map of said input document's content wherein said document map's content is produced by removing a plurality of pre-determined filler words from said input document and comprises fewer words/phrases than said input document, said producing of said document map further comprising producing an associated stem map of stem words/phrases derived from words/phrases of said input document and assigning a plurality of identifiers to said content of said document map and said stem words/phrases of said stem map in a predetermined manner resulting in a preservation of information necessary to substantially reproduce the content of said input document, said document map and associated stem map together being in a form for storing on computer-readable storage for re-processing by said highlighter module at a future time, and wherein said highlighter module applies said weights and/or conditions to said content of said static document map.

3. Apparatus according to claim 2 wherein said determination of key content by said highlighter module results from mathematically calculating scores in respect of the content of said document map.

4. Apparatus according to claim 1 and further comprising a plurality of specialized application modules selectable for execution on the basis of said determinations of said application context module, each said specialized application module being configured for determining, based on said type of document, weights and/or conditions to be applied by said highlighter module to one or more parts of said document map as determined by said specialized application module.

5. Apparatus according to claim 1 wherein said highlighter module produces said highlight document on a graduated basis whereby content of said input document is culled on a as-needed-only basis in order to satisfy basis said predetermined maximum data size.

6. A method for highlighting content of a user's electronic input document and producing therefrom a highlight document, said method comprising the steps of:

(a) determining a context of said input document, based upon: (i) the path through which and/or source from which said document was input; and, (ii) context identifiers of said document used for determining what type of document it is;

(b) determining a context of said user with respect to said input document whereby said user context includes a relationship of said user to said document and/or its source;

(c) determining key content, comprising key words/phrases, key sentences and/or key components, of said input document, up to a predetermined maximum data size, at least in part on the basis of said application context and user context determinations whereby weights and/or conditions derived from said application context and user context determinations are applied to said content of said input document; and, (d) producing said highlight document from said key content.

7. A method according to claim 6, and further comprising the step of producing a static document map of key said input document's content whereby said document map's content is produced by removing a plurality of predetermined filler words from said input document and comprises fewer words/phrases than said input document, said producing of said document man further comprising producing an associated stem map of stem words/phrases derived from words/phrases of said input document and assigning a plurality of identifiers to said content of said document map and said stem words/phrases of said stem map in a predetermined manner resulting in a preservation of information necessary to substantially reproduce the content of said input document, said document map and associated stem map together being in a form for re-processing at a future time, and whereby said weights and/or conditions are applied to said content of said static document map.

8. A method according to claim 7 whereby said determining of key content includes mathematically calculating scores in respect of said content of said document map.

9. A method according to claim 7 whereby said highlight document is produced on a graduated basis whereby content of said input document is culled on a as-needed-only basis in order to satisfy said predetermined maximum data size.

\* \* \* \* \*

UNITED STATES PATENT AND TRADEMARK OFFICE
CERTIFICATE OF CORRECTION

PATENT NO. : 6,820,237 B1
APPLICATION NO. : 09/494312
DATED : November 16, 2004
INVENTOR(S) : Suhayya Abu-Hakima and Connie P. McFarland It is certified that error appears in the above-identified patent and that said Letters Patent is hereby corrected as shown below:

Column 13, line 8, insert --weights-- after "said"
Column 13, line 48, delete the second occurrence of "basis"
Column 14, line 25, delete "key"
Column 14, line 30, delete "man" and insert --map--

Signed and Sealed this

Fifth Day of February, 2008

JON W. DUDAS
*Director of the United States Patent and Trademark Office*